United States Patent [19]
Acree

[11] Patent Number: 5,560,619
[45] Date of Patent: Oct. 1, 1996

[54] GASKET FOR FILLING WHEEL HUB WITH LUBRICANT AND METHOD THEREFOR

[75] Inventor: David C. Acree, Cortez, Colo.

[73] Assignee: Imagine That, Cortez, Colo.

[21] Appl. No.: 458,895

[22] Filed: Jun. 2, 1995

[51] Int. Cl.$^6$ .............................. F16J 15/00; F16N 7/26
[52] U.S. Cl. ..................... 277/23; 184/11.1; 301/105.1; 384/403
[58] Field of Search ..................... 277/23, 237 A; 184/11.1; 384/422, 403, 473; 301/105.1, 108.1, 108.2, 108.4, 124.1

[56] References Cited

U.S. PATENT DOCUMENTS

| | | |
|---|---|---|
| D. 35,064 | 9/1901 | Pulcifer . |
| D. 231,310 | 4/1974 | Burgher . |
| 393,328 | 11/1888 | Finch .................... 301/105.1 |
| 854,234 | 5/1907 | Perry . |
| 1,041,123 | 10/1912 | Lord . |
| 1,042,719 | 10/1912 | Pease . |
| 1,171,244 | 2/1916 | Pugh .................... 301/105.1 |
| 1,245,002 | 10/1917 | Mastin . |
| 1,245,003 | 10/1917 | Mastin . |
| 1,251,920 | 1/1918 | Reichenberger . |
| 1,749,586 | 3/1930 | Johnson . |
| 2,974,646 | 3/1961 | Miller et al. . |
| 4,924,038 | 5/1990 | Klosin et al. . |
| 4,928,551 | 5/1990 | Connelly et al. .................... 384/473 |
| 5,002,165 | 3/1991 | Organ . |
| 5,024,488 | 6/1991 | Lindhuber et al. .................... 301/108.4 |
| 5,152,538 | 10/1992 | Mims .................... 277/189 |
| 5,190,355 | 3/1993 | Hobbie et al. .................... 301/108.1 |
| 5,205,617 | 4/1993 | Hoffmann . |

FOREIGN PATENT DOCUMENTS 62231539   3/1989   Japan .

*Primary Examiner*—Daniel G. DePumpo
*Attorney, Agent, or Firm*—Dorr, Carson, Sloan & Birney, PC

[57] ABSTRACT

A gasket and a method for filling a wheel hub of a floating axle assembly with a lubricant. The gasket includes a sheet of a material suitable for sealing the lubricant in a cavity of the wheel hub when the gasket is mounted between the axle and wheel hub. The sheet has an inner opening and a retaining portion below the inner opening. The retaining portion is of a sufficient predetermined size to at least partially block the inner cavity of the wheel hub when the gasket is mounted to the wheel hub. The method of the present invention includes attaching the gasket to the wheel hub, filling the lower portion of the cavity of the wheel hub with a lubricant, the lubricant being held in the cavity by the retaining portion of the gasket, and assembling the axle to the wheel hub.

8 Claims, 6 Drawing Sheets

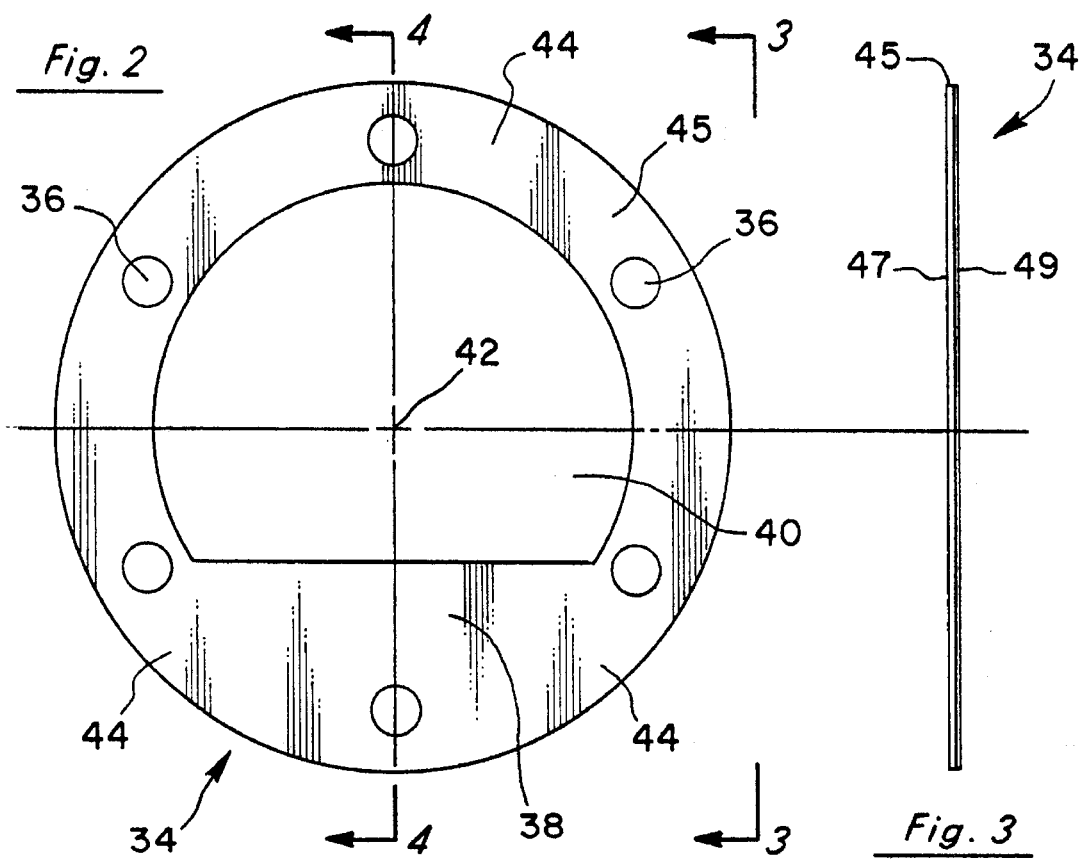
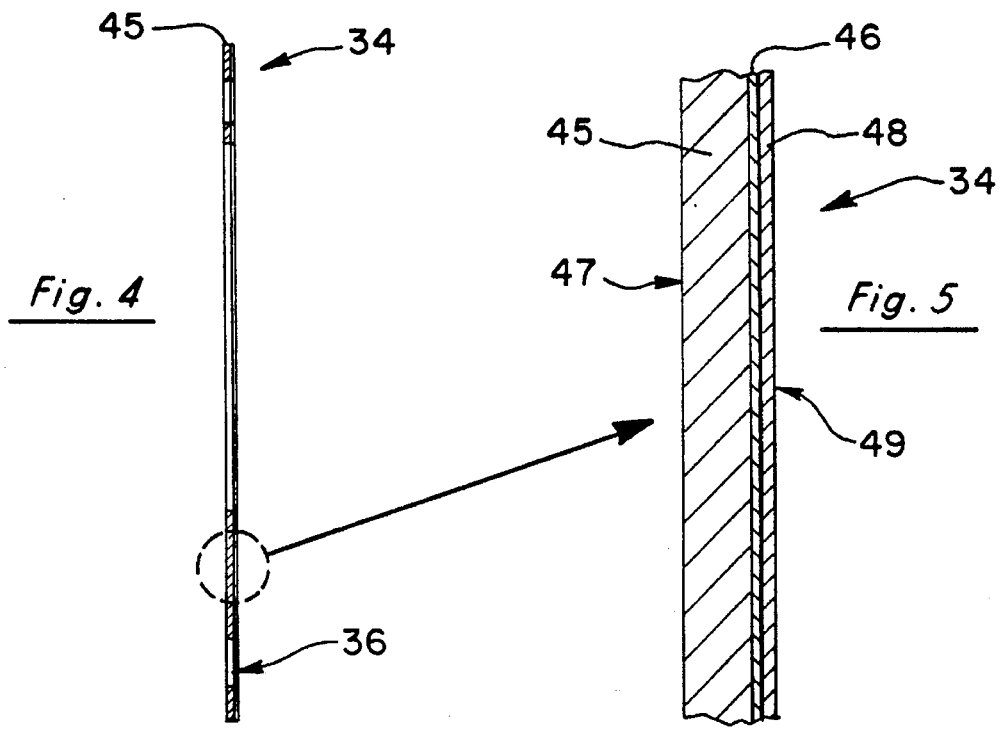

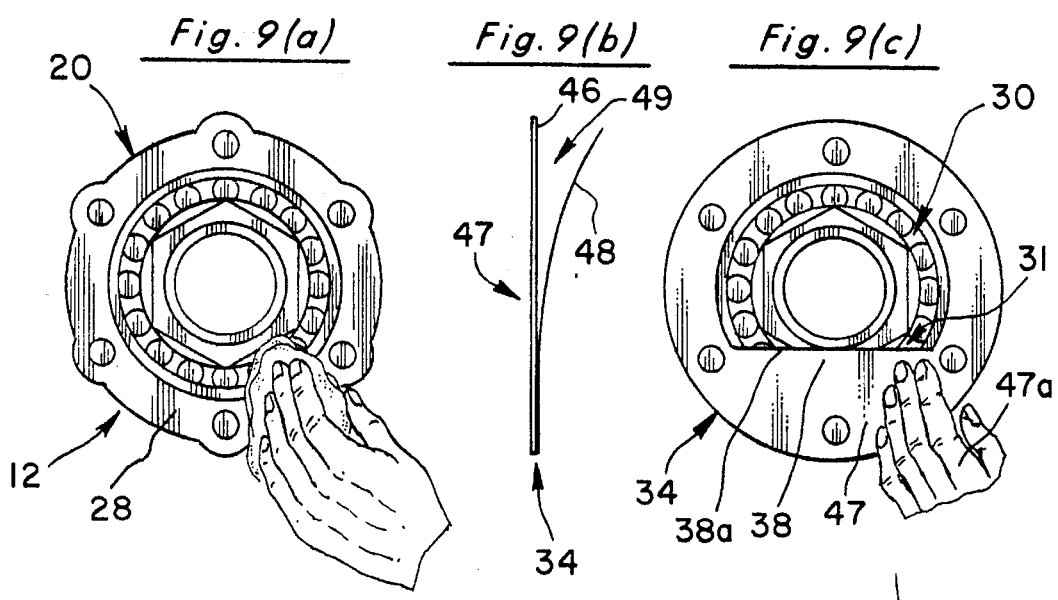
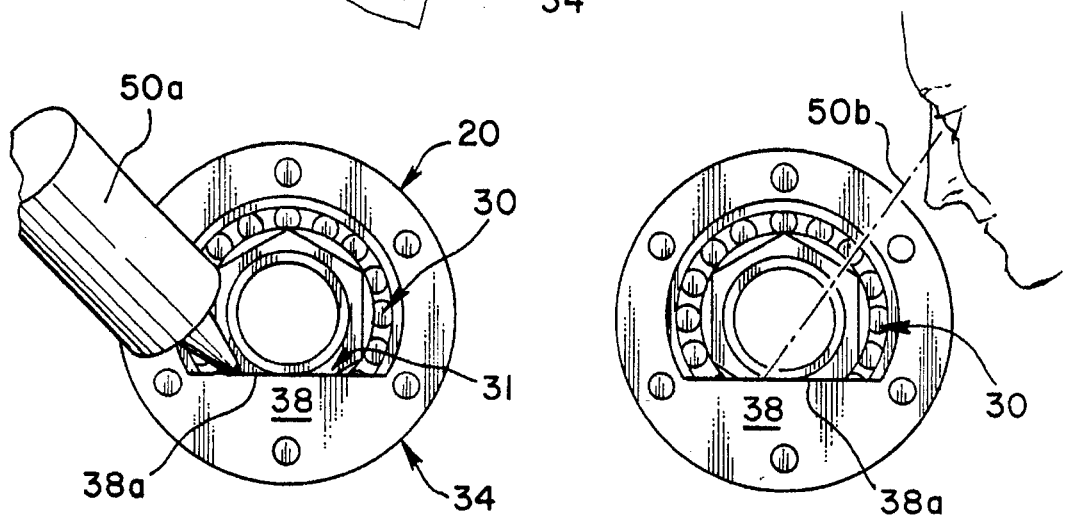
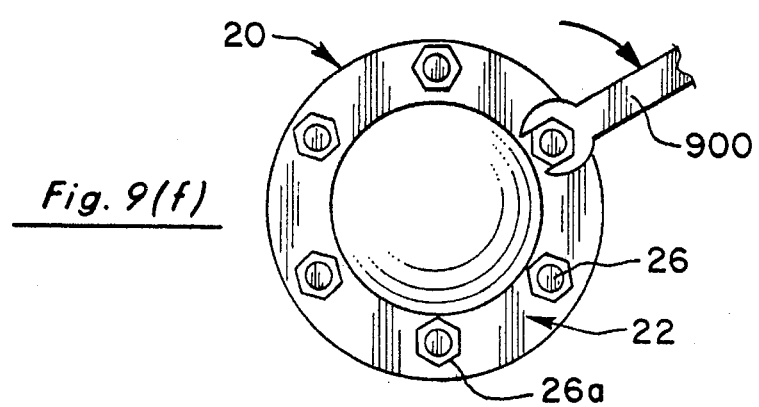

5,560,619

GASKET FOR FILLING WHEEL HUB WITH LUBRICANT AND METHOD THEREFOR

BACKGROUND OF THE INVENTION

1. Field of the Invention

The present invention relates generally to the field of vehicle gaskets, and more particularly to the field of gaskets used on the hubs of vehicles having floating drive axles.

2. Statement of the Problem.

Rear wheel drive vehicles typically have a differential housing, two axle housings, two axles that pass through the axle housings, two wheel hubs, and wheel bearings to support the axle housings on the wheel hubs. Each axle housing is hollow and attached to the differential housing. The axle housings and differential housing are typically a single unitary housing. Tires mounted on rims are conventionally attached to the wheel hubs. Many larger vehicles, such as three-quarter ton pickups and larger trucks, utilize floating axles. A floating axle is an axle that is removable from the hub. A lubricant is contained within the wheel hubs to lubricate the bearings. It is necessary during the life of a vehicle to service the rear wheel bearings, either to replace such bearings or merely to change the lubricant. Furthermore, it often becomes necessary to remove the wheel hub during the servicing of other portions of the vehicle, such as brakes, wheel seals, etc. Whenever a wheel hub is removed from its axle, the lubricant for the wheel bearings is lost and must be replaced. Refilling the wheel hub with lubricant for the wheel bearings is difficult.

The conventional method of supplying new lubricant to the wheel bearings is to reassemble the wheel hubs to the axles, and then to overfill the rear differential. The vehicle is then physically raised using a lifting device so as to incline the vehicle first toward one wheel and then toward the other wheel to encourage the lubricant to flow from the differential toward the wheel bearings through the axle housing. Obviously, having to lift each side of the vehicle adds to the steps and hence time necessary to complete any job requiring the removal of the wheel hub. Another conventional method is to, after overfilling the differential, move the vehicle to an incline. However, while this is easier than lifting the vehicle, moving the vehicle when the wheel bearings are without lubricant can damage the bearings.

Whether lifting or moving the vehicle to an incline, the lubricant, being rather thick, takes significant time to flow through the hollow axle housing into the wheel hub. Since the vehicle can not be operated until the wheel bearings are lubricated, valuable time is lost in lifting or moving the vehicle and then waiting for the lubricant to flow through the axle housings. This lost time adds to the labor costs (as mechanic's time is typically charged by the hour). Also, for commercial vehicles, this lost operating time has considerable value.

Furthermore, the conventional methods are inexact because estimating the correct amount by which to overfill the differential in order to obtain the desired amount of lubricant at the wheel bearings is difficult. Hence, in the current state of the art, the wheel bearings are often either under lubricated or over lubricated, neither condition being desirable. Therefore, it would be advantageous to have a means by which the wheel hub could be immediately reassembled without waiting for the lubricant to drain through the axle housings, and by which a precise amount of lubricant could be supplied directly to the wheel bearings.

Solution to the Problem

The present invention provides a solution to the aforementioned problems by providing a gasket that attaches to the face of each wheel hub to form a barrier behind which a quantity of lubricant can be placed and held without draining while the axle is reattached to the wheel hub. The gasket and method of assembling a wheel hub of the present invention enable a vehicle to be immediately returned to operation after assembling the axles to the wheel hubs by making it unnecessary to overfill the differential. Furthermore, the present invention enables a precise amount of lubricant to be applied directly to the wheel bearings.

SUMMARY OF THE INVENTION

The present invention provides a gasket and a method for filling a wheel hub of a floating axle assembly with a lubricant. The wheel hub of a floating axle assembly typically has an outer face and an inner cavity for holding the lubricant. The present invention provides a gasket that, in one preferred embodiment, is comprised of a sheet of a material suitable for sealing the lubricant in the wheel hub when the gasket is mounted between an axle of the floating axle assembly and the outer face of the wheel hub. The sheet forming the gasket has an inner opening and a solid retaining portion below the inner opening. The solid retaining portion is of a sufficient predetermined size to partially cover the inner cavity of the wheel hub when the gasket is mounted to the outer face of the wheel hub. In an additional embodiment of the gasket of this invention, one side of the sheet has a layer of adhesive, preferably a pressure sensitive adhesive. Preferably, there is included a removable backing material covering the adhesive until the gasket is needed.

The present invention also provides a novel method of filling the wheel hub with a lubricant. As set forth above, the conventional method involved overfilling the differential and waiting for the lubricant to drain into the wheel hub through an axle housing of the floating axle assembly. The gasket described above eliminates the need to overfill the differential, enabling one to directly fill the wheel hub and to visually confirm the level of the lubricant. In use, with the wheel hub removed from the axle, the outer face of the wheel hub is first cleaned to provide a dry surface free of dirt, oil, and dust, all of which would interfere with the adhesion of the adhesive. Using the preferred embodiment of the gasket described above, the backing material is then removed from the gasket, and the side of the gasket having the adhesive is pressed against the outer face of the wheel hub with the solid lower retaining portion covering a lower portion of the cavity. The lower portion of the cavity is then filled with a correct quantity of lubricant, the lubricant being held in place by the lower retaining portion of the gasket. After visually inspecting the lubricant level by looking through the inner opening of the gasket, the axle is assembled to the wheel hub, with the gasket there between forming a seal to prevent the lubricant from leaking out of the floating axle assembly during operation.

Hence, the various embodiments of this invention provide a means to directly fill the wheel hub of a floating axle assembly with a lubricant, eliminating the time wasting, conventional method of overfilling the differential. While this invention has been discussed in the context of a floating axle assembly, it is anticipated that this invention, in its broadest sense of providing a gasket shaped to form a retaining portion across a cavity of a device so as to allow a fluid to be held in place to permit further assembly of the device will find widespread use. Numerous other features, objects, and advantages of the invention will be apparent from the following description when read together with the accompanying drawings.

BRIEF DESCRIPTION OF THE DRAWINGS

The present invention can be more readily understood in conjunction with the accompanying drawings in which:

FIG. 2 is a front plane view of a preferred embodiment of the gasket of the present invention;

FIG. 3 is a side plane view of the preferred embodiment shown in FIG. 2;

FIG. 4 is a cross sectional view of the preferred embodiment shown in FIG. 2;

FIG. 5 is an enlargement of a section of the view shown in FIG. 4;

FIG. 9 illustrates a preferred embodiment of the method of filling a wheel hub with a lubricant of the present invention;

DETAILED DESCRIPTION OF THE INVENTION

Prior Art

Figure 1:
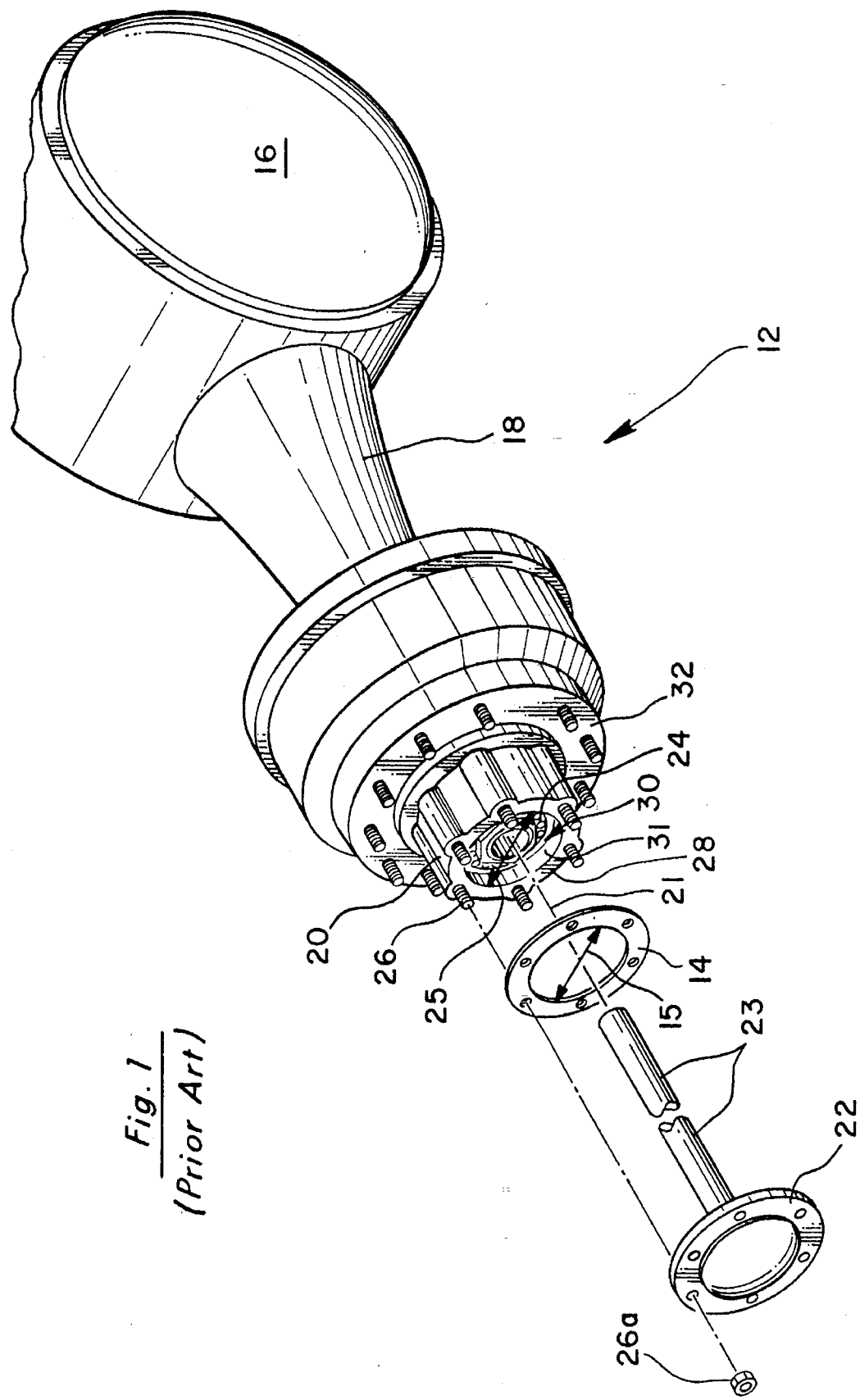
FIG. 1 is an exploded perspective view of a conventional floating axle assembly including a prior art gasket.

Referring now to FIG. 1, a conventional floating axle assembly 12 of a vehicle (not shown), including the gasket 14 of the prior art, is shown. The floating axle assembly 12 typically includes a differential housing 16, an axle housing 18, a wheel hub 20, an axle 22, wheel bearings 24, and fastening means 26 for fastening the axle 22 to the wheel hub 20. FIG. 1 shows the left side of a floating axle assembly 12, with the right side (not shown) being substantially identical, including an axle housing 18 and an axle 22 also mounted to the differential housing 16. This assembly 12 is referred to as "floating" because the axle 22 is removable from the wheel hub 20. Such assemblies are typically used on vehicles such as three-quarter ton pickup trucks and larger vehicles. The wheel hub 20 has an axis of rotation 21, an inner diameter 25, an outer face 28, a cavity 30, and an inner face 32. The cavity 30 has a lower portion 31. A rim and tire assembly (not shown) are typically mounted to the inner face 32. The body of the vehicle (not shown) is typically mounted to the axle housing 18. The axle 22 includes a drive shaft portion 23 with an outside diameter. The axle 22 extends through the axle housing 18 into the differential 16. The wheel bearings 24 require a lubricant (not shown), typically with a weight of S.A.E. 90, to reduce friction in the wheel bearings 24 and to transfer heat from the wheel bearings 24. In order to seal the lubricant for the wheel bearings inside the cavity 30 of the wheel hub 20, the gasket 14 is mounted between the outer face 28 and the axle 22. The prior art gasket 14 typically has an inner circular opening with an inner diameter 15 substantially equal to the inner diameter 25 of the wheel hub 20.

It is necessary during the life of a vehicle to service the rear wheel bearings 24 to replace such bearings 24 or merely to change the lubricant. Furthermore, it often becomes necessary to remove the wheel hub 20 during the servicing of other portions of the vehicle such as brakes, wheel seals, etc. Whenever a wheel hub 20 is removed from its axle 22, the lubricant for the wheel bearings 24 is lost and must be replaced. Refilling the wheel hub 20 with lubricant for the wheel bearings 24 is difficult.

The conventional method of supplying new lubricant to the wheel bearings 24 is to reassemble the wheel hubs 20 to the axles 22, and then to overfill the rear differential 16. The vehicle is then raised using a lifting device so as to incline the vehicle first toward one wheel hub 20 and then toward the other to encourage the lubricant to flow from the differential 16 toward the wheel bearings 24 through the axle housings 18. Obviously, having to lift each side of the vehicle adds to the steps and hence time necessary to complete any job requiring the removal of the wheel hub 20. Another method is to, after overfilling the differential 16, move the vehicle to an incline. However, while this is easier than lifting the vehicle, moving the vehicle when the wheel bearings 24 are without lubricant can damage the wheel bearings 24.

Whether lifting or moving the vehicle to an incline, the lubricant, being rather thick, takes significant time to flow through the hollow axle housings 18 into the wheel hubs 20. Since the vehicle can not be operated until the wheel bearings 24 are lubricated, valuable time is lost in lifting or moving the vehicle and then waiting for the lubricant to flow through the axle housings 18. This lost time adds to the labor costs (as mechanic's time is typically charged by the hour). Also, for commercial vehicles, this lost operating time has considerable value.

Furthermore, this method is inexact because estimating the correct amount by which to overfill the differential 16 in order to obtain the desired amount of lubricant at the wheel bearings 24 is difficult. Hence, in the current state of the art, the wheel bearings 24 are often either under lubricated or over lubricated, neither condition being desirable.

Gasket of Present Invention

The present invention eliminates the need to overfill the differential 16 in order to provide lubricant to the wheel bearings 24 by providing a gasket that attaches to the outer face 28 of the wheel hub 20 to form a barrier behind which a quantity of lubricant can be placed and held without draining while the axle 22 is reattached to the wheel hub 20. The gasket of the present invention enables a vehicle to be immediately returned to operation after reassembling the axles 22 to the wheel hubs 20 by making it unnecessary to overfill the differential 16. Furthermore, the gasket of the present invention enables a precise amount of lubricant to be applied directly to the wheel bearings 24.

The preferred embodiment of the gasket 34 of the present invention is shown in FIG. 2. The gasket 34, like the prior art gasket 14, may be made of any conventional gasketing material that can be formed to a desired shape, or any non-conventional material that will seal the lubricant in the wheel hub when assembled between the wheel hub 20 and axle 22 and that can be formed. Furthermore, the gasket 34, like the prior art gasket 14, includes holes 36 of sufficient size, number, and spacing to accommodate the fastening means 26 of the wheel hub 20. The gasket 34 also has a central axis 42 and an outer portion 44 symmetrically disposed about the central axis 42.

Figure 6:
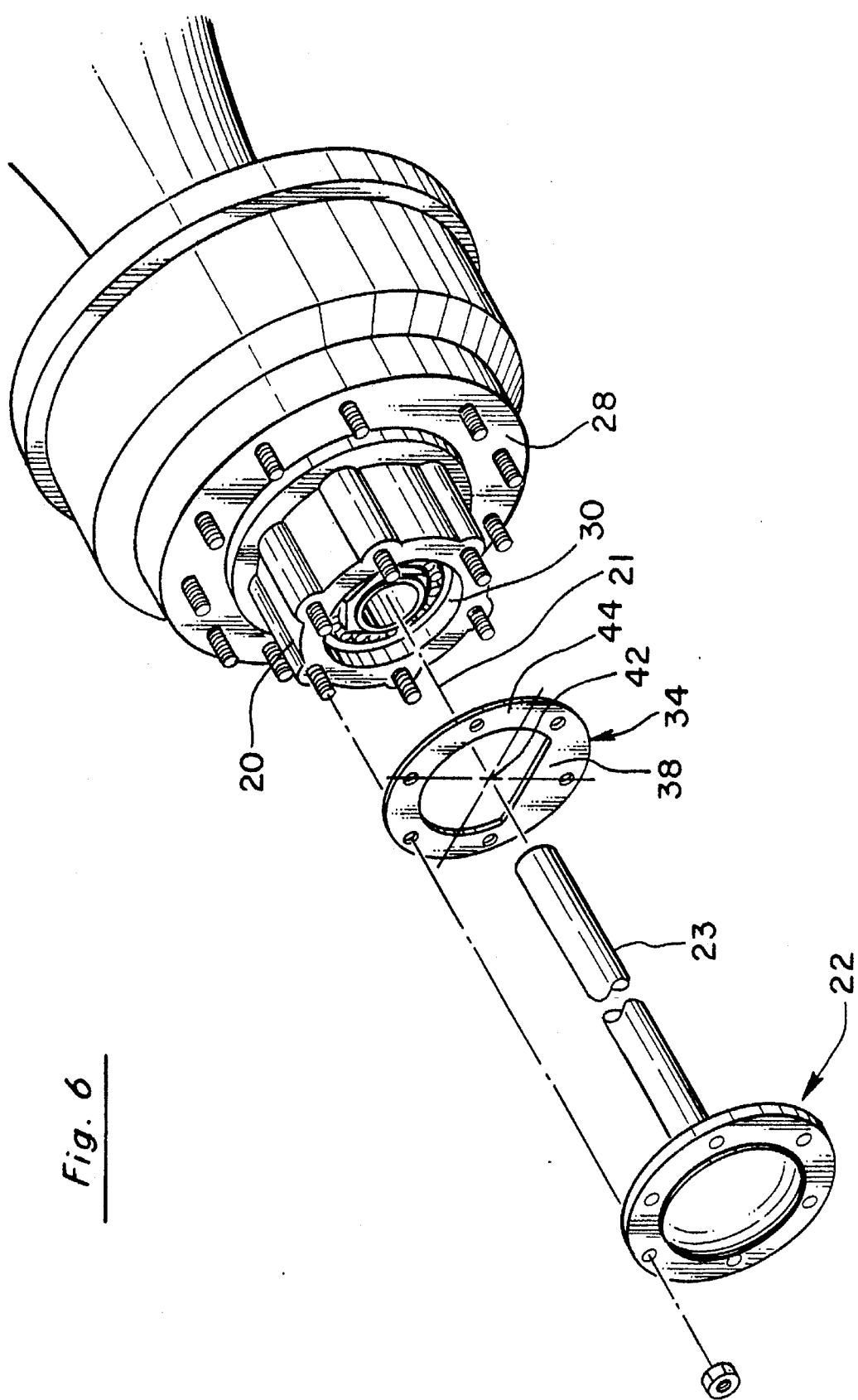
FIG. 6 is an exploded perspective view of the floating axle assembly including the preferred embodiment of the gasket of the present invention.

Unlike the prior art gasket 14 (shown in FIG. 1) or any other gasket found in the prior art, the gasket 36 includes a solid interior retaining portion 38 below an inner opening 40. The inner formed opening 40 is at least a circle concentric with the central axis 42 having an outer diameter larger than the outside diameter of the drive shaft portion 23 of the axle 22 because, in the assembly of the floating axle assembly 12, the drive shaft portion 23 of the axle 22 must pass through the wheel hub 20 into the differential 16. The interior retaining portion 38 is of a predetermined area to partially cover the inner cavity 30 of the wheel hub 20 when the outer portion 44 is mounted against the outer face 28 of the wheel hub 20 with the central axis 42 substantially aligned with the axis of rotation 21 of the wheel hub 20, as shown in FIG. 6. As shown in FIG. 3, the gasket 34 is of a thin sheet 45 of a material suitable for sealing a lubricant in the wheel hub 20. The gasket 34 has a front side 47 and a back side 49.

Figure 7:
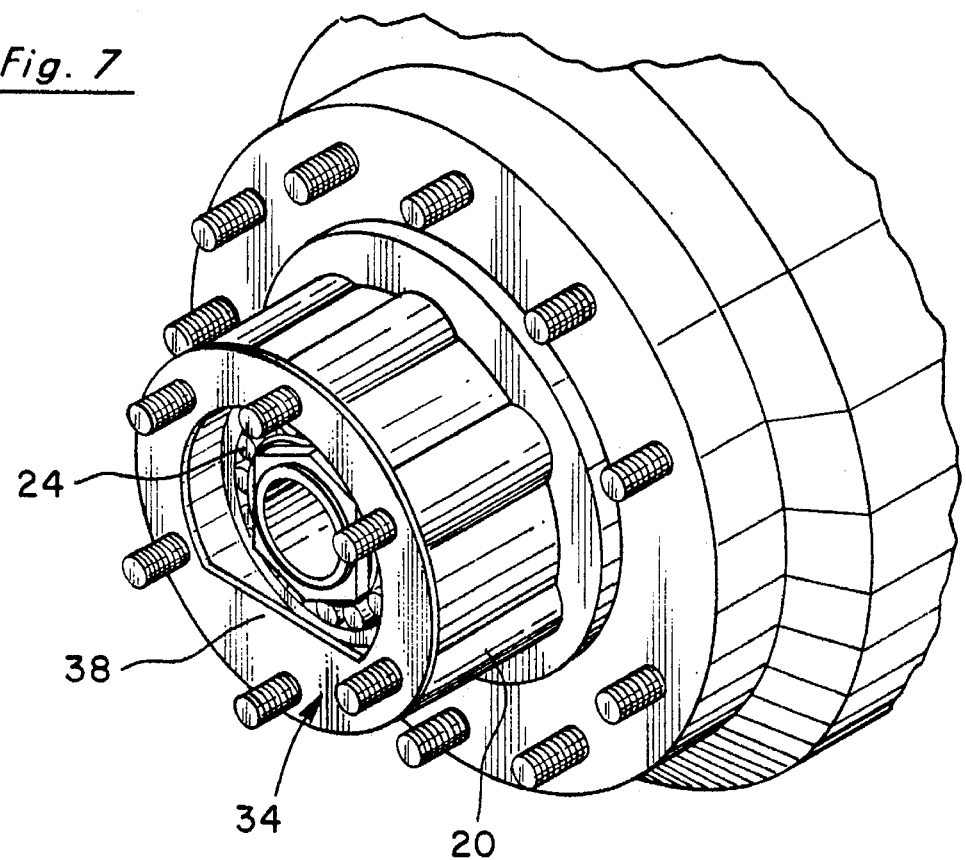
FIG. 7 is a perspective view of the floating axle assembly with the preferred embodiment of the gasket of the present invention installed.
Figure 8:
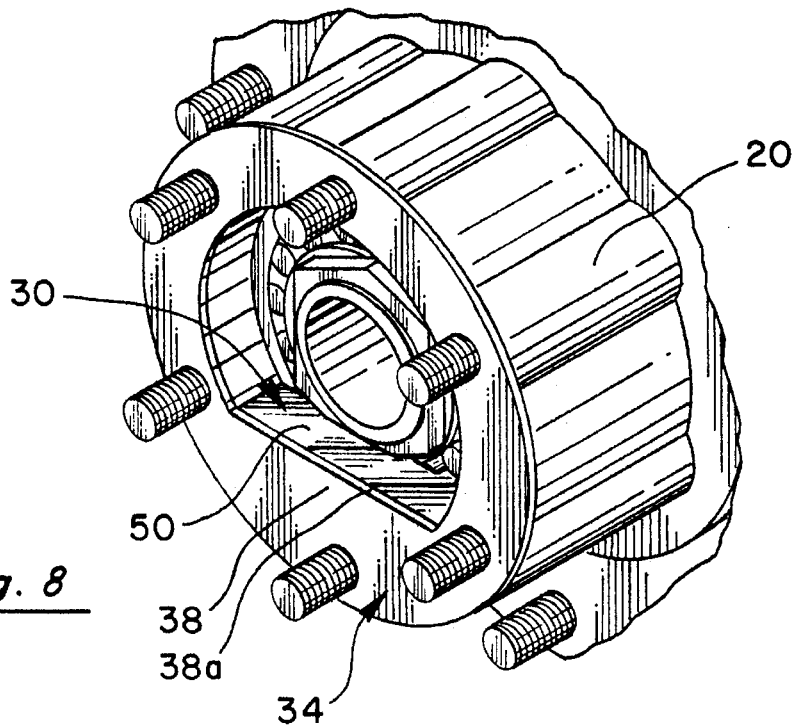
FIG. 8 is a perspective view of the floating axle assembly with the preferred embodiment of the gasket of the present invention installed and retaining a lubricant.

As shown in FIGS. 6 and 7, the gasket 34 is mounted to the outer face 28 of the wheel hub 20. In using the gasket of the present invention, it is essential that a means for mounting the gasket to the outer face 28 of the wheel hub 20 be used. Such means should hold the gasket in place so that a conventional lubricant 50 (the lubricant described above as used with the prior art) can be placed into the cavity 30 of the wheel hub 20 without draining, as shown in FIG. 8. A separate adhesive could be applied to the outer face 28, or any other suitable means could be used. However, as shown in FIGS. 4 and 5, the preferred embodiment 34 of the gasket of the present invention includes a thin layer 46 of adhesive on one side of the sheet 45 of material suitable for sealing (i.e., "gasketing" material). For even greater convenience, a paper backing 48 is included to protect the layer 46 of adhesive from contamination before use. In this preferred embodiment, the adhesive used is sold under the product name Scotch 3M 467MP High Performance Adhesive by the 3M Corp. of Minnesota. This product is a layer 46 of adhesive with paper backing on both sides. In the manufacture of the gasket 34, one side of this layer 46 of adhesive is exposed and pressed against the sheet 45 of gasketing material, and the paper backing 48 is left to be removed upon use of the gasket 34. However, many other suitable adhesive products are available. The essential requirement for the layer 46 of adhesive or other means for mounting the gasket of the present invention is that it hold the gasket 34 against the outer face 28 so as to retain the lubricant 50 within the cavity 30 (as shown in FIG. 8) while the axle 22 is assembled to the wheel hub 20.

It is to be expressly understood that the present invention does not require that the means for mounting the gasket, including an adhesive, be affixed to the gasket itself. For example, an adhesive could be spread on the outer face 28, and then the gasket 34 (without any adhesive layer 46) could be placed against the outer face 28.

Method of the Present Invention

The preferred embodiment of the method of the present invention for filling the wheel hub 20 with the lubricant 50 is shown in FIGS. 9(a) through 9(f). The preferred embodiment of this method includes providing the gasket 34 described above. After providing the floating axle assembly 12 described above with the wheel hub 20 removed from the axle 22, the outer face 28 is cleaned with a suitable material to provide a dry surface free of the prior gasket (if it has adhered to said surface), the gasket sealing material (if any), and any dirt, oil, and dust, all of which would interfere with the adhesion of the layer 46 of adhesive to the outer face 28. (The prior art gasket 14 is designed to be used dry, and typically is installed as such at the factory, although some individuals choose to use a silicon sealant applied to both the axle 22 and the outer face 28 before assembling.)

As shown in FIG. 9(b), the paper backing 48 is removed from the gasket 34. As shown in FIG. 9(c), the back side 49 of the gasket 34 is placed against the outer face 28 so as to have the upper edge 38a horizontal to ground. Pressure by a hand 47a is applied to the front side 47 of the gasket 34 so as to attach the gasket 34 by the layer 46 of adhesive. As shown, the gasket 34 is placed with the lower retaining portion 38 at the lower portion 31 of the cavity 30 so as to partially cover the cavity 30.

As shown in FIG. 9(d), after attaching the gasket 34 to the outer face 28, the lower portion 31 of the cavity 30 is filled with the lubricant 50 from a container 50a to a level (as more clearly shown in FIG. 8) even with or slightly below edge 38a. As shown in FIG. 9(e), the level of the lubricant 50 in the cavity 30 is visually inspected 50b to insure that a sufficient quantity of lubricant 50 has been added. Again, as shown in FIG. 8, the retaining portion 38 holds the lubricant 50 in the cavity 30.

The axle 22 can then be assembled to the gasket-attached wheel hub 20 (as shown in FIG. 9(f)) with a conventional wrench 900. After complete assembly, the vehicle can immediately be placed back into operation. This method is superior to the conventional method described above, which would require the additional steps of overfilling the differential 16 and then tilting or moving the vehicle in order to obtain lubricant in the cavity 30.

Alternative Gasket Embodiments

Figure 10:
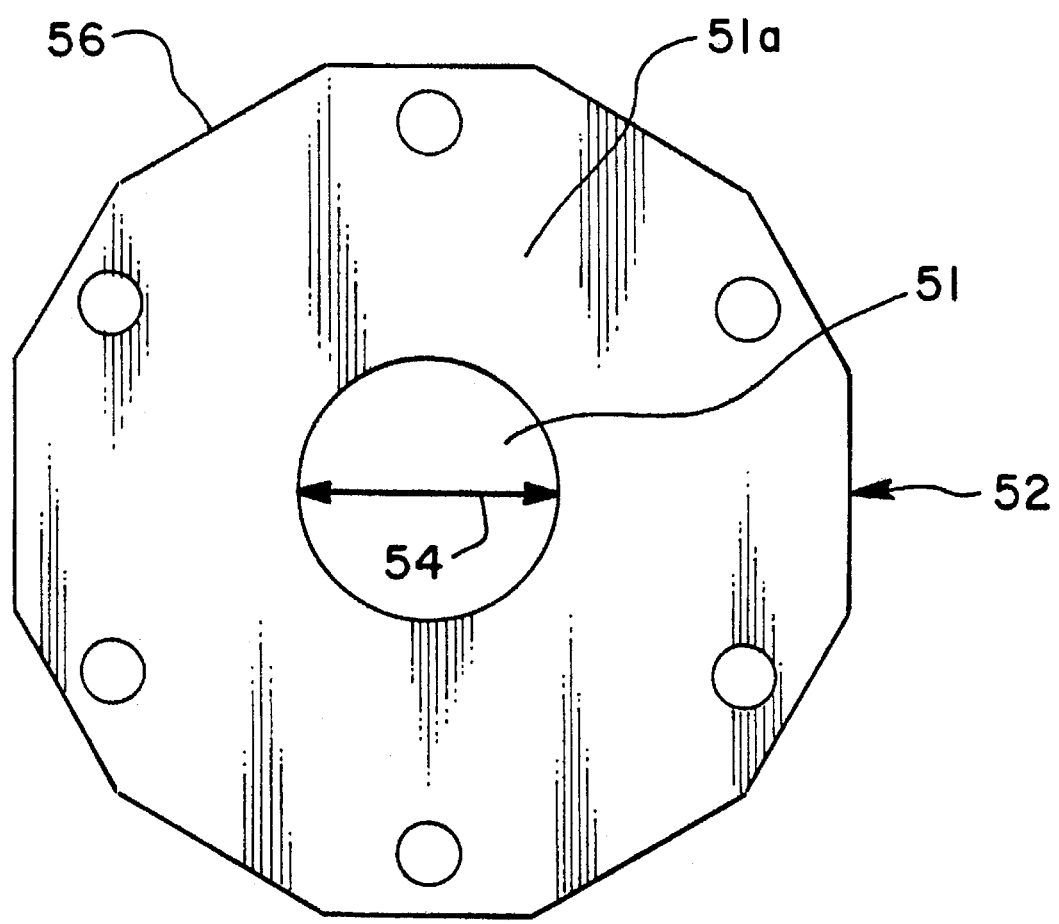
FIG. 10 shows a front plane view of an alternative embodiment of the gasket of the present invention.

It is to be expressly understood that the present invention includes many embodiments not expressly described above. For instance, one alternative embodiment 52 of the gasket of the present invention is shown in FIG. 10. Compare this alternative embodiment gasket 52 with the preferred embodiment gasket 34 (shown in FIGS. 1–9), which includes a semicircular inner opening 40 with a radius substantially the same as half of the inside diameter 25 of the wheel hub 20. The gasket 34 has a lower retaining portion 38 below the inner opening 40, the retaining portion 38 intersecting the inner opening 40 as a chord. In contrast, the alternative embodiment gasket 52 has an inner opening 51 that is circular with an inner diameter 54 that is slightly larger than the outside diameter of the drive shaft portion 53 of the axle 22, thereby allowing passage of the axle 22 through the gasket 52 during assembly. In this alternative embodiment, additional area 51a surrounds opening 51 and the orientation when mounting this gasket is immaterial. The alternative embodiment gasket 52 is as functional as the preferred embodiment gasket 34. However, the preferred embodiment gasket 34 is a superior design because the larger opening 40 of this gasket 34 facilitates visual inspection, as shown in FIG. 9(e), whereas the smaller opening of the alternative embodiment gasket 52 makes it more difficult to visually inspect the lubricant level. Furthermore, the size of the horizontal, chord-like retaining portion 38 of the gasket 34 can be (although not necessarily) selected so as to indicate the correct lubricant level (the correct level being even with or slightly below the horizontal upper edge 38a).

Also, the outer periphery 56 of the gasket of the present invention, as shown on the alternative embodiment gasket 52, is not required to be circular like the periphery of the preferred embodiment gasket 34. However, the outer circular shape of the preferred embodiment gasket 34 is easier to manufacture. Likewise, the inner opening 51 of the alternative embodiment gasket 52 is not required to be circular as long as it provides clearance for the axle 22. Hence, the gasket 34 is the preferred embodiment, although many other variations are within the scope of the present invention.

It should be understood that the particular embodiments shown in the drawings and described within this specification are for the purpose of example and should not be construed to limit the invention that will be described in the claims below. Now that a number of examples of the apparatus and method of the present invention have been given, numerous other applications should be evident to one skilled in the art. Further, it is evident that those skilled in the art may now make numerous uses and modifications of the specific embodiments described without departing from the inventive concepts disclosed herein. It should be obvious that the various members described may be made from a variety of materials and using a wide combination of dimensions. Consequently, the invention is to be construed as embracing each and every novel feature and novel combination of the features present in or possessed by the apparatus and methods described herein.

What is claimed is:

1. A gasket in combination with a wheel hub of a floating axle assembly, said wheel hub having an outer face and an inner cavity for holding a lubricant, said gasket comprising:

a sheet of a material, said sheet of material having a semicircular inner opening and a retaining portion below said semicircular inner opening, said retaining portion intersecting said semicircular inner opening as a chord, whereby when said gasket is mounted to said outer face of said wheel hub said retaining portion holds said lubricant in said inner cavity.

2. The gasket of claim 1, further including means for attaching said gasket to said outer face of said wheel hub.

3. The gasket of claim 2, wherein said attaching means includes a layer of an adhesive on one side of said sheet.

4. The gasket of claim 3, further including a removable sheet of material attached to said layer of adhesive.

5. A gasket in combination with a wheel hub of a floating axle assembly of a vehicle, said wheel hub having an outer face with an inside diameter symmetrically disposed about a cavity, said gasket comprising:

a sheet of a material suitable for sealing, said sheet having a semicircular opening with a radius substantially the same as half of the inside diameter of said outer face of said wheel hub, said sheet having a lower retaining portion below said semicircular opening for covering a portion of said cavity, said retaining portion intersecting said semicircular opening as a chord.

6. The gasket of claim 5 further including means for attaching said sheet to said outer face of said wheel hub.

7. The gasket of claim 6 wherein said attaching means includes layer of an adhesive on one side of said sheet.

8. The gasket of claim 7, further including a removable sheet of material attached to said layer of adhesive.

* * * * *